United States Patent [19]

Hayes

[11] 3,850,073
[45] Nov. 26, 1974

[54] FASTENER
[75] Inventor: Kenneth L. Hayes, Visalia, Calif.
[73] Assignee: Berryfast, Inc., Tulare, Calif.
[22] Filed: Mar. 7, 1973
[21] Appl. No.: 338,864

[52] U.S. Cl. ................................................ 85/20
[51] Int. Cl. ........................ E01b 9/06, F16b 15/06
[58] Field of Search .............. 85/44, 20, 22, 21, 47, 85/28; 151/41.73; 52/700

[56] References Cited
UNITED STATES PATENTS

| 510,035 | 12/1893 | Lipe | 85/20 |
|---|---|---|---|
| 1,194,047 | 8/1916 | Lynch | 85/20 |
| 2,099,990 | 11/1937 | Rosenberg | 85/28 |
| 2,183,243 | 12/1939 | Meersteiner | 85/44 |
| 2,226,006 | 12/1940 | Maze | 85/28 |
| 2,232,336 | 2/1941 | Meersteiner | 85/47 |
| 2,562,516 | 7/1951 | Williams | 85/47 X |
| 3,088,361 | 5/1963 | Hallock | 85/28 |
| 3,434,171 | 3/1969 | Lischer et al. | 85/47 X |

FOREIGN PATENTS OR APPLICATIONS

| 17,477 | 9/1895 | Great Britain | 85/47 |

Primary Examiner—Ramon S. Britts
Attorney, Agent, or Firm—Robert R. Thornton

[57] ABSTRACT

A fastener adapted for attaching roofing insulation to a sheet metal base has a shank of a nominal diameter terminating on the one end in a head and at the opposite end in a point and has a threaded portion on only a part of the shank, the threaded portion tapering inwardly in diameter in the direction of the point so as to originate and terminate in shank portions of the nominal diameter and the threaded portion having a plurality of longitudinal helical grooves formed therein.

11 Claims, 3 Drawing Figures

PATENTED NOV 26 1974

3,850,073

FASTENER

BACKGROUND OF THE INVENTION

1. Field of the Invention

This invention relates to a fastener of the driven type especially adapted for use in the attachment of insulation to a sheet metal base such as is commonly used in roofing.

2. Description of the Prior Art

A variety of fasteners of the driven type have heretofore been utilized for attachment of various materials to metal bases. An example of such a fastener adapted for use in roofing is shown in U.S. Pat. No. 3,088,361 issued May 7, 1963. Another type of fastener, utilized to fasten metallic objects to a metal base, is shown in U.S. Pat. No. 2,183,243 issued Dec. 12, 1939. A third type of fastener, adapted for use with wood rather than metal, is shown in U.S. Pat. No. 364,302, issued June 7, 1887. However, none of these fasteners have proved completely satisfactory for use in attaching roofing insulation to a sheet metal base, particularly in view of the current state of the art which makes use of collated fasteners and automatic nailing machines in order to rapidly insert a great many fasteners by use of the nailer, rather than by the use of a hand held hammer as is the case in the patents referred to above. Consequently, the prior art devices have not, for various reasons, proved practical either for use with automatic nailers or provided the required holding power when used with roofing insulation for attachment to a sheet metal base.

SUMMARY OF THE INVENTION

According to the present invention, a fastener adapted for attaching roofing insulation to a sheet metal base has a shank of a nominal diameter which terminates on the one end in a head and at the opposite end in a point, and includes means forming a threaded portion on only a part of the shank, said threaded portion being located intermediate of and remote from the head and point and tapering inwardly in diameter in the direction of the point so as to originate and terminate in shank portions of said nominal diameter and having means forming a plurality of longitudinal helical grooves in the threaded portion. In the preferred embodiment, the longitudinal helical grooves are U-shaped and under cut the base of the threads in the threaded portion of the shank.

BRIEF DESCRIPTION OF THE DRAWING

The invention may be more readily understood by referring to the accompanying drawing in which.

DESCRIPTION OF THE PREFERRED EMBODIMENT

Figure 1:
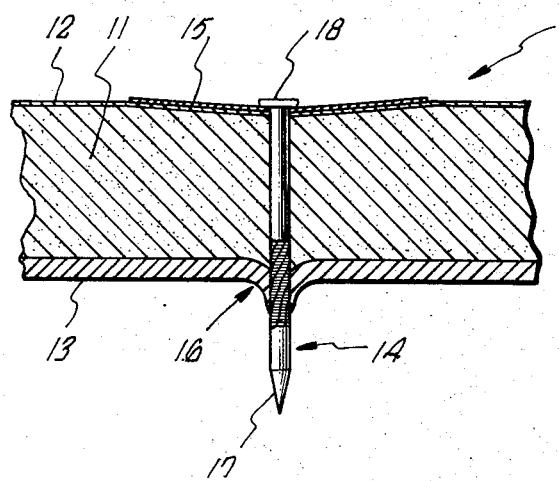
FIG. 1 is a view, partially in section, of a fastener according to the invention when in place holding roofing insulation to a sheet metal base or roof deck.

Referring now to FIG. 1, there is shown, partially in section, a section of roofing 10 including a portion of roofing insulation 11, which may, for example, be wood fiber, glass fiber or perlite board, which has a protective covering 12 fixed to the top thereof. The insulation 11 rests on a sheet metal roof deck 13 and is attached thereto by a fastener 14 which has been driven through a metal holding disc 15 of conventional construction, the insulation 11, and sheet metal deck 13. As will be seen in FIG. 1, the sheet metal deck 13 has been deformed at 16 by means of a point 17 on the fastener 14 to form an aperture through which the fastener 14 extends. The fastener 14 has been driven through the sheet metal deck 13 by any conventional means, preferably a pneumatic hammer, which applies a driving blow to a head 18 on the fastener.

Figure 2:
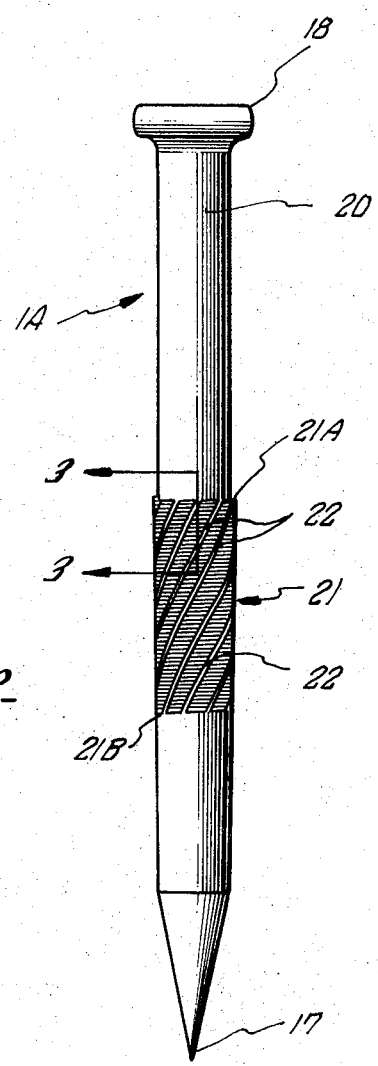
FIG. 2 is a plan view of the fastener of FIG. 1.

Referring now to FIG. 2, there is shown a plan view of the fastener 14. The fastener 14, in addition to the head 18 and point 17, has a shank 20 of a nominal diameter D located intermediate of the head 18 and point 17. The shank 20 has a threaded shank portion 21. As will be seen in FIG. 2, the threaded shank portion 21 is remote from both the head 18 and point 17, and covers only a minor portion of the length of the shank 20. The length of the threaded portion 21 is dependent, to a certain extent, upon the thickness of the sheet metal through which the fastener 14 is to be driven and its location along the shank is such as to be less than the overall thickness of the insulation 11 at its origination point 21A closest to the head 18. The threaded portion 21 has a termination point 21B at its opposite end. The origination point 21A and termination point 21B are remote, respectively, from the head 18 and point 17 and the threaded portion 21 originates and terminates where the shank 20 retains its nominal diameter D. By way of example, for use with steel deck of 22 gauge or somewhat heavier material, the overall length of the fastener may be approximately 2 inches, and the length of the threaded portion approximately 0.6 inches for insulation of 1 inch thickness.

As will be seen in FIG. 2, the threaded portion 21 consists of a plurality of screw type threads formed about the shank 20. These threads may be formed by any conventional manner, but, in the preferred embodiment, the threads taper in outer diameter inwardly from origination point 21A to termination point 21B, as will be described in greater detail with respect to FIG. 3. In addition, the threaded portion 21 has a plurality of helical grooves 22 of high pitch, formed longitudinally with respect to the shank 20 along the threaded portion 21.

Figure 3:
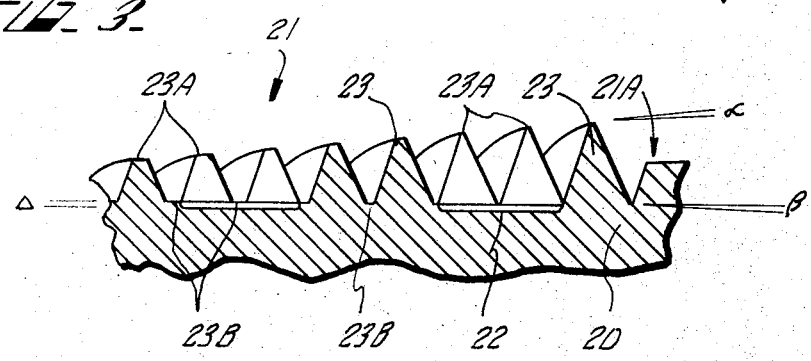
FIG. 3 is a partial sectional view, taken along lines 3—3 of FIG. 2, and not to scale, illustrating the general relationship between the threads and helical grooves of the fastener.

Referring now to FIG. 3, there is shown, partially in section, a view taken along lines 3—3 of FIG. 2 as illustrative of the general relationship between the shank 20, helical grooves 22 and threaded portion 21. As will be seen in FIG. 3, the threaded portion 21 consists of a plurality of individual threads 23 formed in the shank 20. The threads 23 have an outer surface 23A and an inner surface 23B. The threads 23 originate and terminate in the diameter D of the shank. At the origination point 21A of the theads, the threads extend outwardly from, and are cut into the shank the greatest amount. The threads taper inwardly in outer diameter from the origination point 21A to the termination point 21B. Similarly, the threads taper outwardly in inner diameter in the same manner. In the preferred embodiment, the angle of taper $\alpha$ for the inward taper of the outer thread surfaces 23A is 44 minutes and the angle of taper $\beta$ for the outward taper of the inner thread surfaces 23B is also 44 minutes. The threaded portion 21 is located along the shank 20 according to the thickness of insulation with which it is to be used so that at least a substantial portion, but not all, of the threaded portion extends through the insulation so as to engage the sheet deck. The termination point 21B is so located that an appreciable portion of the shank 20 of diameter D extends therebeyond.

As will be seen in FIG. 3, in the preferred embodiment the helical grooves 22 are generally U-shaped in configuration. In addition, the helical grooves 22 under cut the threads 23 so that the diameter of the shank at any helical groove 22 is less than the corresponding diameter of the threaded portion at that point by a dimension $\Delta$. The dimension $\Delta$, in the preferred embodiment, for a 2 inch long fastener is between 0.005 and 0.015 inches, the threads 23 being 56 threads per inch of either unified or American standard type threads. A helix angle of 65° has been found satisfactory for the helical grooves 22 which may be spaced 0.05 inches apart, with respect to the 2 inch fastener having a nominal shank diameter of 0.162 inches, so as to provide 10 helical grooves extending longitudinally along the shank, each groove being of 0.010 inch width. The helical grooves are preferably formed as number 8-type U drive screw threads. As will further be apparent from FIG. 3, in the preferred embodiment, the threads 23 are formed so that, as they decrease in outer diameter, the cross sectional configuration of the threads becomes frustoconical and inclined, with respect to the nominal diameter, toward the point 17, both as to the inner surface and the outer surface of the thread.

In the preferred embodiment of fastener according to the present invention, the threaded portion 21 is approximately five-eighths of an inch in length. The origination point 21A of the threaded portion is preferably located on the shank 20 so that, when the fastener is utilized, all but about one-eighth of an inch of the threaded portion 21, and no less that about one-sixteenth of an inch, extends into or has passed through the sheet metal 13.

In practice, it has been found that the fastener of the present invention provides a greatly increased holding power with respect to fasteners of the conventional configuration. For example, as compared to a fastener identical to the fastener of the present invention but having a threaded portion of the type shown in the aforementioned U.S. Pat. No. 2,183,243, the holding power of the fastener is more than doubled. These improved results are provided by the use of a thread which has a major diameter at the origin 21A of 0.178 inches and a minor diameter at the origin 21A of 0.146 inches for a 0.162 nominal diameter shank 20 of 2 inch length.

The invention claimed is:

1. A fastener adapted for attaching roofing insulation to a sheet metal base comprising
   a shank of a nominal diameter and terminating at one end in a head and at the opposite end in a point,
   means forming a circumferential threaded portion on only a part of the shank, said circumferential threaded portion being located intermediate of and remote from the head and point and tapering inwardly in outer diameter and outwardly in inner diameter in the direction of the point so that the threads originate and terminate in shank portions of said nominal diameter, and
   means forming a plurality of longitudinal helical grooves in the threaded portion.

2. A fastener according to claim 1 and in which the helical grooves are substantially U-shaped in cross section.

3. A fastener according to claim 2 and in which the helical grooves under cut the threads in the threaded portion.

4. A fastener according to claim 3 and in which the threads generally are fructoconical in cross-sectional configuration.

5. A fastener according to claim 4 and in which the theads taper inwardly in outer diameter at an angle of approximately 44 minutes.

6. A fastener according to claim 4 and in which the threads taper outwardly in inner diameter at an angle of approximately 44 minutes.

7. A fastener according to claim 4 and in which the helical grooves are formed at a helix angle of about 65°.

8. A fastener according to claim 5 and in which the threads taper outwardly in inner diameter at an angle of approximately 44 minutes.

9. A fastener according to claim 7 and in which the helical grooves are spaced about 0.05 inches apart.

10. A fastener according to claim 7 and in which the helical grooves are of about 0.01 inch width.

11. A fastener according to claim 7 and in which the helical grooves undercut the threads by from about 0.005 to 0.015 inches.

* * * * *

UNITED STATES PATENT OFFICE
CERTIFICATE OF CORRECTION

Patent No. 3,850,073  Dated November 26, 1974

Inventor(s) KENNETH L. HAYES

It is certified that error appears in the above-identified patent and that said Letters Patent are hereby corrected as shown below:

Col. 3, line 39       "that" should read --than--
Col. 4, line 28       "fructoconical" should read --frustoconical--

Signed and sealed this 4th day of March 1975.

(SEAL)
Attest:

RUTH C. MASON
Attesting Officer

C. MARSHALL DANN
Commissioner of Patents
and Trademarks